(12) United States Patent
Yajima

(10) Patent No.: US 10,359,042 B2
(45) Date of Patent: Jul. 23, 2019

(54) CHECK VALVE AND LIQUID SUPPLY APPARATUS HAVING THE SAME

(71) Applicant: Koganei Corporation, Koganei-shi, Tokyo (JP)

(72) Inventor: Takeo Yajima, Koganei (JP)

(73) Assignee: Koganei Corporation, Koganei-shi, Tokyo (JP)

( * ) Notice: Subject to any disclaimer, the term of this patent is extended or adjusted under 35 U.S.C. 154(b) by 237 days.

(21) Appl. No.: 15/326,131

(22) PCT Filed: Feb. 10, 2015

(86) PCT No.: PCT/JP2015/053582
§ 371 (c)(1),
(2) Date: Jan. 13, 2017

(87) PCT Pub. No.: WO2016/009665
PCT Pub. Date: Jan. 21, 2016

(65) Prior Publication Data
US 2017/0211570 A1    Jul. 27, 2017

(30) Foreign Application Priority Data
Jul. 17, 2014 (JP) .................. 2014-146486

(51) Int. Cl.
*F04B 43/02* (2006.01)
*F04B 43/08* (2006.01)
(Continued)

(52) U.S. Cl.
CPC .......... *F04B 53/1087* (2013.01); *F04B 43/02* (2013.01); *F04B 43/08* (2013.01);
(Continued)

(58) Field of Classification Search
CPC ........ F04B 43/084; F04B 43/02; F04B 43/08; F16K 15/046; F16K 27/0245
See application file for complete search history.

(56) References Cited

U.S. PATENT DOCUMENTS 4,091,839 A * 5/1978 Donner ................. F16K 15/044
137/533.13
4,597,511 A * 7/1986 Licari ................. B05B 11/3067
137/454.6
(Continued)

FOREIGN PATENT DOCUMENTS

JP    H07-310838 A    11/1995
JP    3320896 B2    9/2002
(Continued)

OTHER PUBLICATIONS

International Search Report for PCT Serial No. PCT/JP2015/053582 dated May 12, 2015.

*Primary Examiner* — Eric Keasel
(74) *Attorney, Agent, or Firm* — McCormick, Paulding & Huber LLP

(57) ABSTRACT

A check valve which allows liquid to flow in one direction while preventing liquid from flowing in a direction reverse to said one direction, the check valve comprising: an inflow port allowing liquid to flow therein; an outflow port allowing liquid to flow out thereof; a valve seat provided between the inflow port and the outflow port, the valve seat having a valve hole through which the inflow port communicates with the outflow port; a valve chamber provided between the valve seat and the outflow port; a valve element disposed in the valve chamber, the valve element opening and closing the valve hole; a plurality of holding surfaces located radially outside the valve element, the holding surfaces extending in an axial direction; and an elastic member supported on the holding surfaces and set in the valve
(Continued)

chamber, the elastic member applying an elastic force directed toward the valve hole to the valve element.

14 Claims, 13 Drawing Sheets

(51) Int. Cl.
  *F04B 53/10* (2006.01)
  *F16K 15/04* (2006.01)
  *F16K 27/02* (2006.01)

(52) U.S. Cl.
  CPC .......... *F04B 43/084* (2013.01); *F04B 53/102* (2013.01); *F04B 53/1002* (2013.01); *F16K 15/046* (2013.01); *F16K 27/0245* (2013.01)

(56) References Cited

U.S. PATENT DOCUMENTS

| 4,700,741 | A | * | 10/1987 | Murphy | F16K 15/044 |
| | | | | | 137/539 |
| 4,895,499 | A | * | 1/1990 | Gargas | F04B 53/1002 |
| | | | | | 137/539.5 |
| 5,855,225 | A | * | 1/1999 | Williams, III | F16K 15/06 |
| | | | | | 137/529 |
| 7,871,250 | B2 | | 1/2011 | Yajima | |
| 2008/0115662 | A1 | | 5/2008 | Yajima | |
| 2010/0051118 | A1 | | 3/2010 | Nelson et al. | |

FOREIGN PATENT DOCUMENTS

| JP | 2003-127014 A | 5/2003 |
| JP | 2006-29423 A | 2/2006 |
| JP | 2008-128059 A | 6/2008 |
| JP | 4547368 B2 | 9/2010 |

* cited by examiner

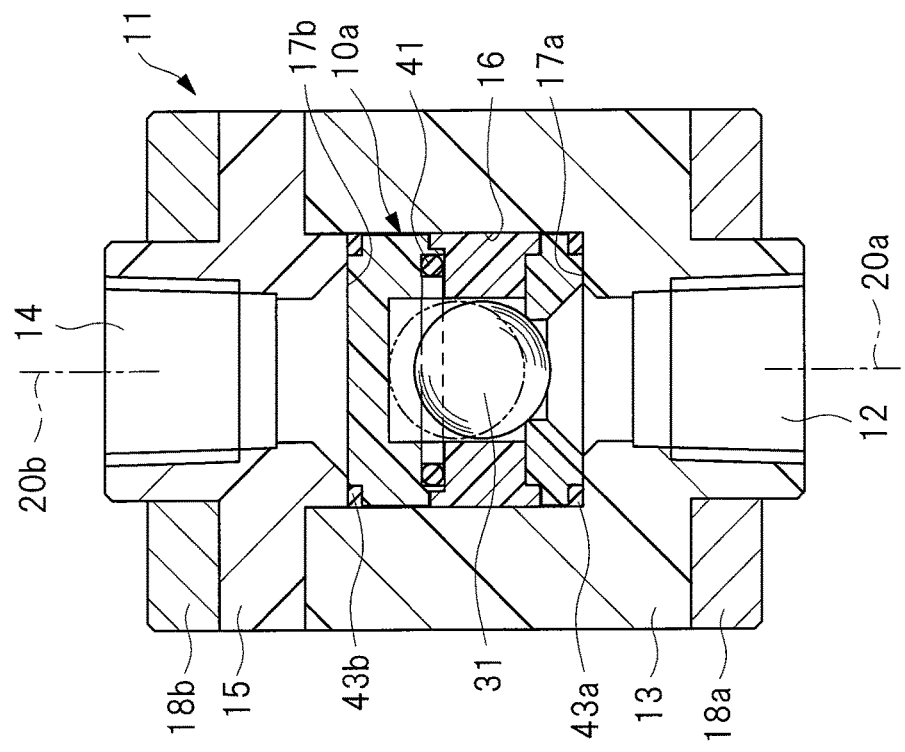
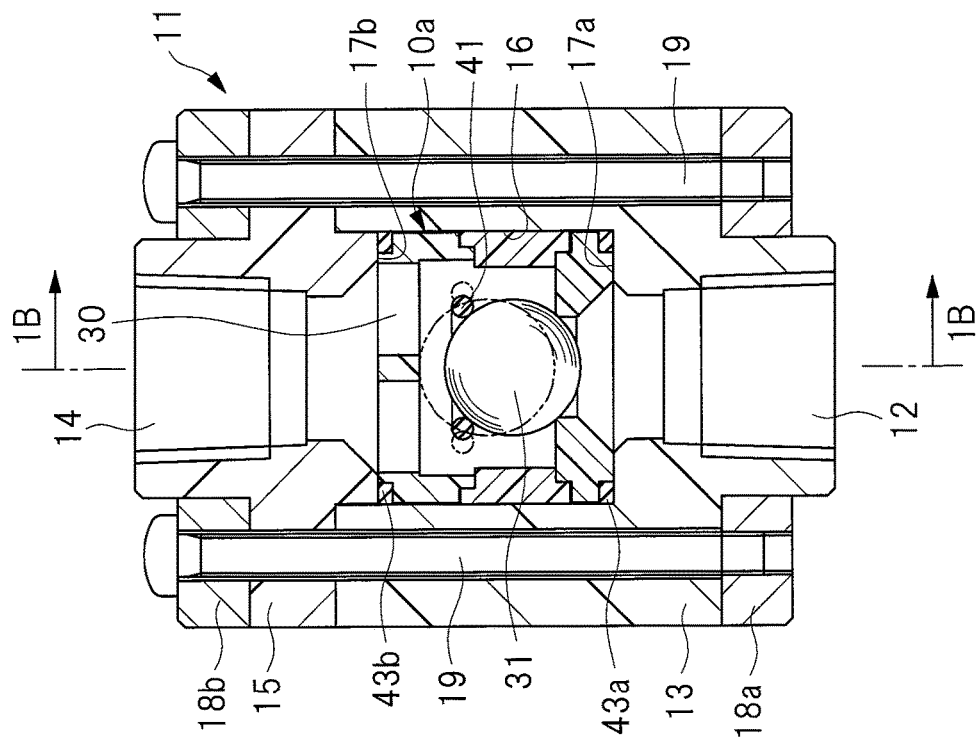

CHECK VALVE AND LIQUID SUPPLY APPARATUS HAVING THE SAME

CROSS-REFERENCE TO RELATED APPLICATION

This application is entitled to the benefit of and incorporates by reference subject matter disclosed in International Patent Application No. PCT/JP2015/053582 filed on Feb. 10, 2015 and Japanese Patent Application No. 2014-146486 filed on Jul. 17, 2014, the contents of all of which are incorporated by reference herein.

TECHNICAL FIELD

The present invention relates to a check valve which allows liquid to flow in a forward direction while preventing liquid from flowing in a backward direction, and relates to a liquid supply apparatus having this check valve.

BACKGROUND ART

A liquid supply apparatus is used to apply liquid such as photoresist solution to a surface such as for example semiconductor wafer and glass substrate for liquid crystal. The liquid supply apparatus includes a pump which causes a pump chamber to expand and contract. Japanese Patent No.: 3320896 discloses one example in which a pump chamber is separated by a bellows and a diaphragm. Japanese Patent No.: 4547368 discloses another example in which a pump chamber is separated by a flexible tube capable of elastic deformation. A pump referred to as "bellows pump" has a bellows serving as a pump member. A pump referred to as "diaphragm pump" has a diaphragm serving as a pump member. A pump referred to as "tube diaphragm pump" has a tube serving as a pump member. A pump referred to as "syringe pump" has a cylinder and a piston which reciprocates in the cylinder.

In each pump, an inflow-side check valve is disposed in an inflow-side channel between an inflow port of the pump chamber and a liquid container, and an outflow-side check valve is disposed on an outflow-side channel between an outflow port of the pump chamber and a liquid discharge member. The inflow-side check valve allows liquid to flow in a forward direction from the liquid container toward the pump chamber and prevents liquid from flowing in a backward direction. The outflow-side check valve allows liquid to flow in the forward direction from the pump chamber toward the liquid discharge member and prevents liquid from flowing in the backward direction. In this manner, each check valve is used to allow liquid to flow in the forward direction and to prevent liquid from flowing in the backward direction. As one example, a check valve to be incorporated in a housing containing a pump member is known, and as another example, a check valve to be coupled to a pipe connected to the housing is known.

In a check valve which is used in a liquid supply apparatus which supplies liquid to the discharge member, when pump operation stops, a valve element is moved downward by its own weight, comes in contact with a valve seat, and closes a valve hole. For example, in a liquid supply apparatus which supplies low viscosity liquid to the discharge member, when a pump operation is stopped, the valve element closes the valve hole in a relatively short time. On the other hand, in a liquid supply apparatus which supplies high viscosity liquid to the discharge member, after a pump operation is stopped, the valve element to be moved downward by its own weight takes a long time to come in contact with the valve seat and close the valve hole. For this reason, in the check valve incorporated in the liquid supply apparatus which supplies high viscosity liquid to the discharge member, a spring is required to apply a bias force directed toward the valve seat to the valve element.

When a photoresist solution is applied to a workpiece, the photoresist solution comes in contact with metal material, and the photoresist solution is deteriorated by metal material. For this reason, to prevent such a problem, Japanese Patent application Laid-Open Publication No.: 2003-127014 discloses that a spring made of fluorocarbon resin showing superior chemical resistance is used for the check valve.

SUMMARY

However, when the spring made of fluorocarbon resin is exposed to a creep phenomenon which is a phenomenon that the spring is permanently deformed by a load applied for a long period of time, a predetermined spring force cannot be obtained. Therefore, operating characteristics of the check valve reduces. Consequently, the check valve requires frequent maintenance work for replacing the spring with new one.

If a resin coil spring is incorporated in the check valve, since the amount of deflection of the resin coil spring is limited so as to be made smaller than the amount of deflection of a metal coil spring, the resin coil spring is required to be made longer in this case. For this reason, since the check valve is required to have a relatively long length, it is impossible to reduce the size of the check valve and of the liquid supply apparatus.

An object of the present invention is to provide a check valve improved in size, and configured so that a bias force directed toward a valve seat is applied to a valve element.

According to one aspect of the present invention, there is provided a check valve which allows liquid to flow in one direction while preventing liquid from flowing in a direction reverse to said one direction, the check valve comprising: an inflow port allowing liquid to flow therein; an outflow port allowing liquid to flow out thereof; a valve seat provided between the inflow port and the outflow port, the valve seat having a valve hole through which the inflow port communicates with the outflow port; a valve chamber provided between the valve seat and the outflow port; a valve element disposed in the valve chamber, the valve element opening and closing the valve hole; a plurality of holding surfaces located radially outside the valve element, the holding surfaces extending in an axial direction; and an elastic member supported on the holding surfaces and set in the valve chamber, the elastic member applying an elastic force directed toward the valve hole to the valve element.

According to another aspect of the present invention, there is provided a liquid supply apparatus which supplies liquid held in a liquid container to a discharge device, the liquid supply apparatus comprising: a pump block including a pump chamber communicating with an inflow-side channel and with an outflow-side channel; a drive member incorporated in the pump block, the drive member causing the pump chamber to expand and contract; an inflow-side check valve disposed in the inflow-side channel, the inflow-side check valve allowing liquid to flow from the inflow-side channel to the pump chamber when the pump chamber expands, while preventing liquid from flowing backward from the pump chamber to the inflow-side channel when the pump chamber contracts; and an outflow-side check valve disposed in the outflow-side channel, the outflow-side check valve allowing liquid to flow from the pump chamber to the outflow-side channel when the pump chamber contracts, while preventing liquid from flowing backward from the outflow-side channel to the pump chamber when the pump chamber expand, wherein at least either the inflow-side check valve or the outflow-side check valve is constituted by the above check valve having an elastic member.

An elastic member which applies an elastic force directed toward a valve hole to a valve element is supported on a plurality of holding surfaces. These holding surfaces are located radially outside the valve element and extend in an axial direction. Therefore, the check valve in which a bias force is applied to the valve element can be improved in size without being increased in longitudinal dimension. It is possible to reduce the size of the liquid supply apparatus by incorporating the check valve having an elastic member into the liquid supply apparatus.

BRIEF DESCRIPTION OF THE DRAWINGS

FIG. 1A is a vertical cross-sectional view of a check valve according to one embodiment;

FIG. 1B is a cross-sectional view taken along a line 1B-1B of FIG. 1A;

DETAILED DESCRIPTION

Figure 2:
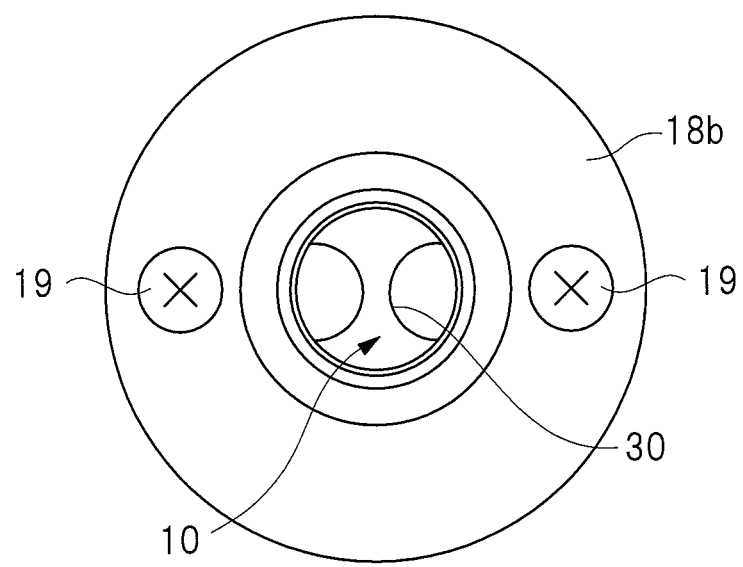
FIG. 2 is a plan view of the check valve of FIG. 1A.

Hereinafter, embodiments of the present invention will be described in detail with reference to the accompanying drawings. In each embodiment, members the same in function as each other are denoted by the same reference character.

FIG. 1 shows a check valve 10a used as an independent single valve. The check valve 10a is housed in a housing 11, and includes a first housing piece 13 having an inflow port 12, and a second housing piece 15 having an outflow port 14. Each of the housing pieces 13 and 15 is made of fluorocarbon resin. The first housing piece 13 is formed with a cylindrical housing hole 16. The first housing piece 13 has a contact surface 17a, while the second housing piece 15 has a contact surface 17b. The check valve 10a is placed in the housing hole 16 such that the check valve 10a is in contact with the contact surface 17a and with the contact surface 17b.

A first reinforcing ring 18a is disposed on the outer surface of the first housing piece 13, and a second reinforcing ring 18b is disposed on the outer surface of the second housing piece 15. Both reinforcing rings 18a and 18b are fastened with a plurality of screws 19 to assemble the housing 11. The reinforcing rings 18a and 18b are each made of metal.

A pipe 20a having an inflow-side channel is connected to the inflow port 12, while a pipe 20b having an outflow-side channel is connected to the outflow port 14. The check valve 10a allows liquid flow from the inflow port 12 toward the outflow port 14, thus causes liquid to flow from the pipe 20a to the pipe 20b. The check valve 10a, on the other hand, blocks liquid from flowing the outflow port 14 toward the inflow port 12, thus preventing liquid from flowing backward from the pipe 20b to the pipe 20a. In this manner, the check valve 10a allows liquid to flow in one direction while preventing liquid from flowing in a direction reverse to said one direction.

As shown in FIG. 3, the check valve 10a has an annular valve seat 21. A valve hole 22 is formed at the radial center of the valve seat 21 such that the valve hole 22 communicates with the inflow-side channel. The check valve 10a has a case body 24 forming a valve chamber 23 together with the valve seat 21. Each of the case body 24 and the valve seat 21 forms part of a valve case 25. The case body 24 and the valve seat 21 are made of fluorocarbon resin.

Figure 4A:
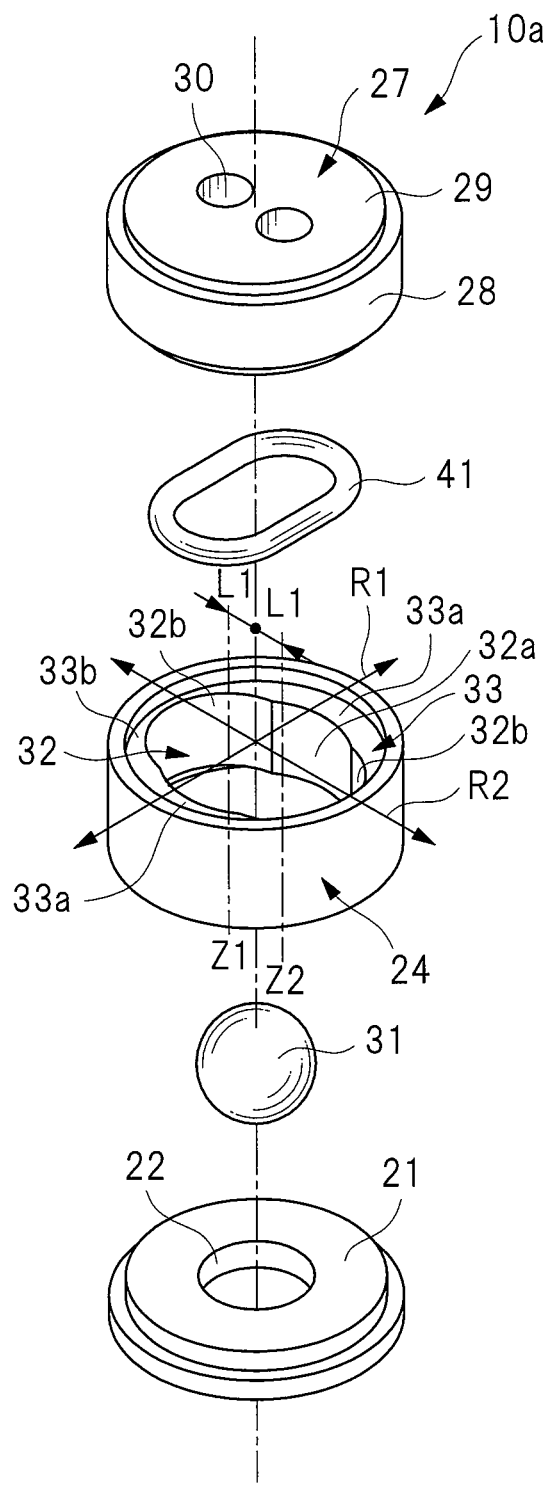
FIG. 4A is an exploded perspective view of the check valve of FIG. 3.

The case body 24 has a cylindrical member 26 and a holder 27. One end of the cylindrical member 26 is fitted with the valve seat 21, and the other end of the cylindrical member 26 is fitted with the holder 27. The valve seat 21, the cylindrical member 26, and the holder 27 are fitted together to collectively constitute the valve case 25. The holder 27 has: a cylindrical portion 28 fitted to the cylindrical member 26; and an end wall portion 29 formed integrally with the cylindrical portion 28. The end wall portion 29 has two communication holes 30 formed offset to the center of the end wall portion 29, as shown in FIG. 4A. The communication holes 30 communicate with the outflow-side channel. Therefore, the valve chamber 23 communicates with the outflow-side channel via the communication holes 30.

A spherical valve element 31 is disposed in the valve chamber 23 in which the valve element 31 opens and closes the valve hole 22. The valve element 31 comes in contact with the valve seat 21 to close the valve hole 22, and separates away from the valve seat 21 to open the valve hole 22. When liquid is supplied from the inflow-side channel to the valve chamber 23, the valve hole 22 opens, thereby causing liquid to flow through the valve chamber 23 from the valve hole 22 to the communication holes 30. In FIGS. 1 and 3, two-dot chain lines indicate a state of the valve element 31 keeping away from the valve seat 21.

Figure 3A:
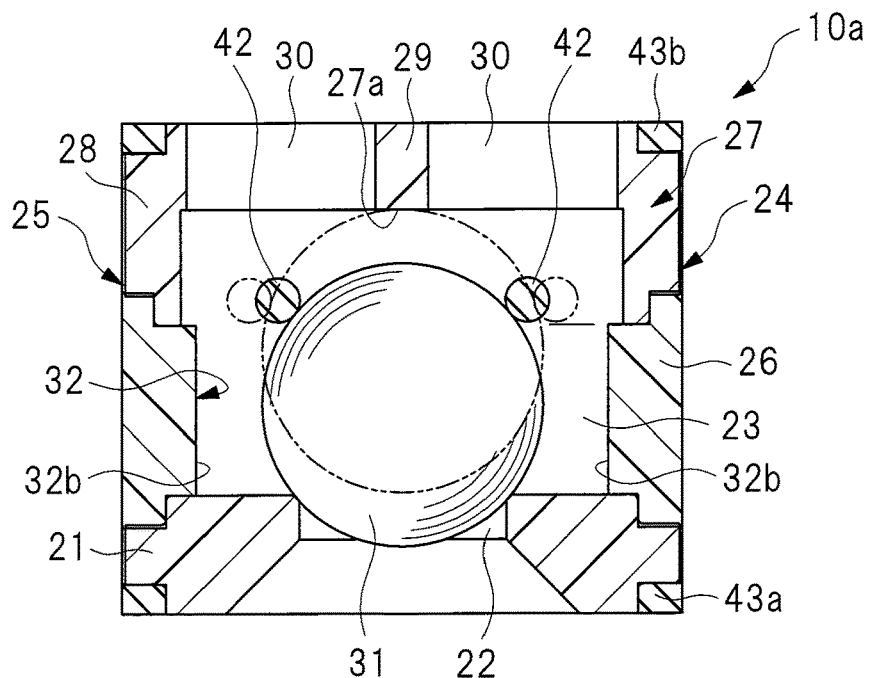
FIG. 3A is an enlarged cross-sectional view showing a main part of the check valve of FIG. 1A.
Figure 3B:
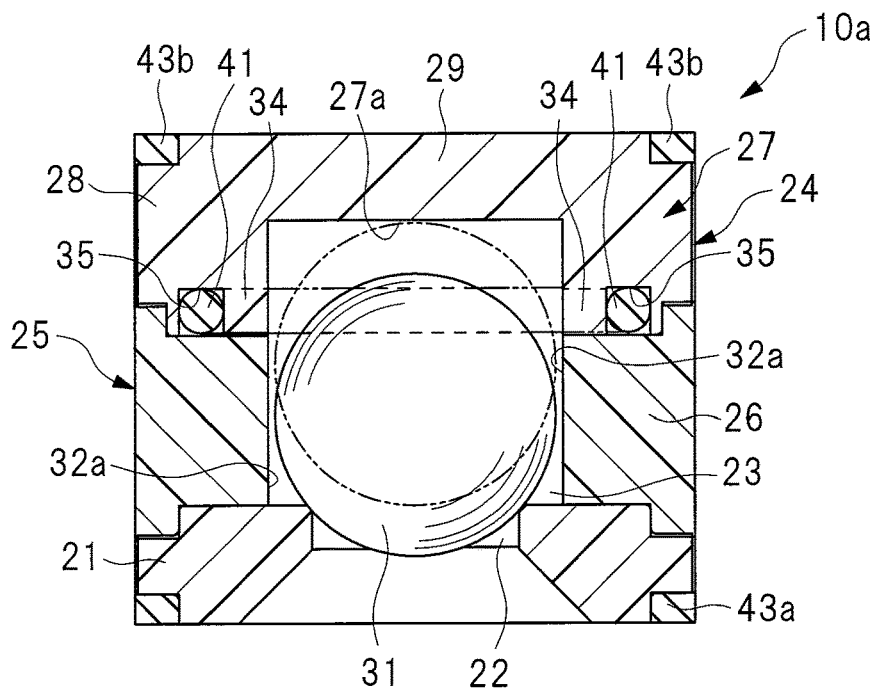
FIG. 3B is an enlarged cross-sectional view showing a main part of the check valve of FIG. 1B.
Figure 4B:
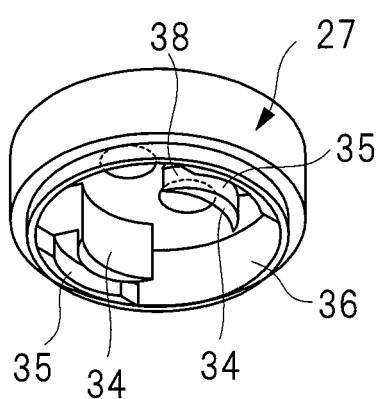
FIG. 4B is a perspective view of an interior of a holder shown in FIG. 4A.

The cylindrical member 26 in which the valve element 31 is housed has two concentric arcuate surfaces 32a and two eccentric arcuate surfaces 32b. The concentric arcuate surfaces 32a and the eccentric arcuate surfaces 32b are counter to the valve element 31, as shown in FIGS. 4A and 4B. The concentric arcuate surfaces 32a, which are segments of the outer surface of a cylinder having a radius slightly larger than that of the valve element 31 are formed on the cylindrical member 26, and the concentric arcuate surfaces 32a are counter to each other in an arrow direction R1 with respect to the axis of the valve hole 22 which serves as a common axis. Two axes Z1 and Z2 are set eccentric to the axis of the valve hole 22 in opposite directions, and separated from the axis of the valve hole 22 across the same distance L1 along an arrow direction R2 perpendicular to the arrow direction R1. The eccentric arcuate surfaces 32b are formed on the cylindrical member 26, and partially form cylindrical inner spaces having axes Z1 and Z2. As shown in FIGS. 3A and 3B, liquid channels formed between the eccentric arcuate surfaces 32b and the valve element 31 is larger in width than liquid channels formed between the concentric arcuate surfaces 32a and the valve element 31. The concentric arcuate surfaces 32a and the eccentric arcuate surfaces 32b jointly form an inner peripheral surface 32 of the cylindrical member 26.

The cylindrical member 26 has a counter surface 33 counter to the front end surface of the holder 27. The counter surface 33 has: counter portions 33a continuous with the concentric arcuate surfaces 32a; and counter portions 33b continuous with the eccentric arcuate surfaces 32b, and the counter portions 33a are larger in radial thickness than the counter portion 33b. As shown in FIGS. 3B and 4B, two engaging projections 34 are formed on the holder 27, and correspond to the counter portions 33a larger in radial thickness than the counter portions 33b. The engaging projections 34 are counter to each other, formed around to the center axis of the cylindrical member 26, and extend in an axial direction. An engaging groove 35 is formed between each engaging projection 34 and an inner peripheral surface 36 of the cylindrical portion 28. Each engaging groove 35 is formed radially outside the engaging projection 34, and therefore located radially outside the valve element 31. Each of the engaging projections 34 has holding surfaces 38 counter to the inner peripheral surface 36 of the cylindrical portion 28.

As shown in FIG. 4, an annular elastic member 41 is placed in the valve chamber 23. The elastic member 41 is made of rubber material. The elastic member 41 is supported on the holding surfaces 38, and therefore set in the valve chamber 23. The elastic member 41 is shaped into an ellipse, and traverses a flow of liquid in the valve chamber 23. With the elastic member 41 set in the valve chamber 23, the elastic member 41 has two supported portions on the holding surfaces 38 and two contact portions 42 shifted in a circumferential direction by 90 degrees with respect to the supported portions, as shown in FIG. 3A. The contact portions 42 come in contact with the valve element 31, thereby allowing the elastic member 41 to apply an elastic force directed toward the valve hole 22 to the valve element 31.

Figure 5A:
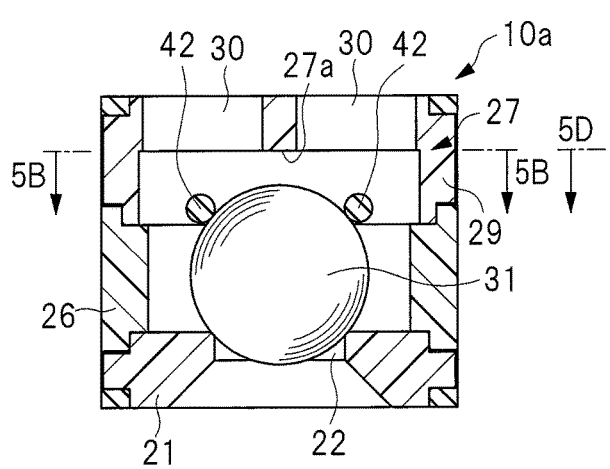
FIG. 5A is a vertical cross-sectional view of the check valve in which a valve element leaves a valve hole closed.
Figure 5C:
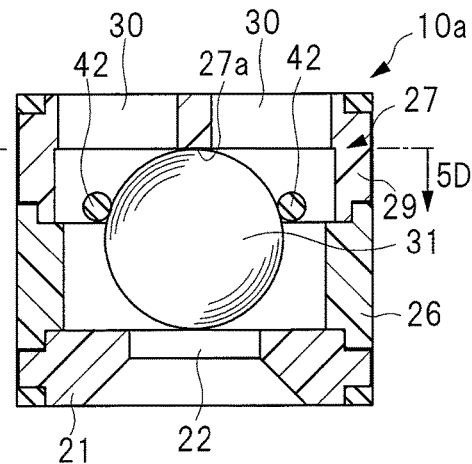
FIG. 5C is a vertical cross-sectional view of the check valve in which the valve element leaves the valve hole open.
Figure 5B:
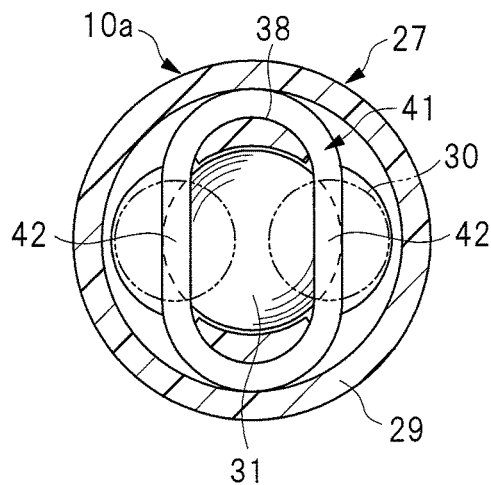
FIG. 5B is a cross-sectional view taken along a line 5B-5B of FIG. 5A.

FIGS. 5A and 5B show a state in which the valve element 31 is in contact with the valve seat 21, and closes the valve hole 22. This state results when the sum of a liquid pressure at the outflow port 14 and a pressing force applied by the elastic member 41 becomes larger than liquid pressure at the inflow port 12, causing the valve element 31 to close the valve hole 22. This prevents liquid from flowing from the valve chamber 23 toward the inflow port 12.

Figure 5D:
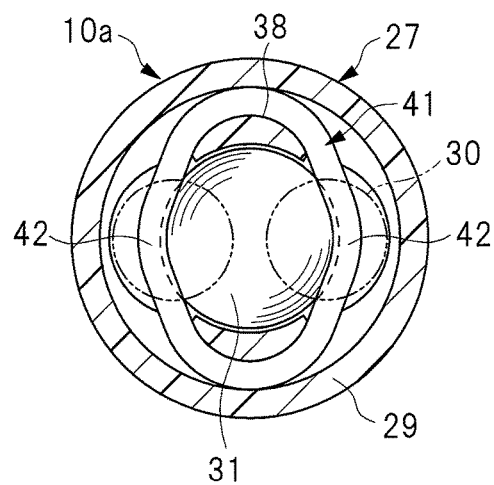
FIG. 5D is a cross-sectional view taken along a line 5D-5D of FIG. 5C.

FIGS. 5C and 5D show a state in which the liquid pressure at the inflow port 12 becomes larger than the sum of the liquid pressure at the outflow port 14 and the pressing force applied by the elastic member 41, thereby causing the valve element 31 to separate away from the valve seat 21 to leave the valve hole 22 open. Liquid flowing through the opened valve hole 22 into the valve chamber 23 travels through the communication holes 30 and finally comes out of the check valve 10a. During this process, the valve element 31 separated away from the valve seat 21 comes in contact with a stopper surface 27a of the end wall portion 29 to restrict the further movement of the valve element 31. In this manner, the holder 27 for holding the elastic member 41 functions as a stopper which restricts the movement of the valve element 31. When the flow rate of liquid flowing into the valve chamber 23 is low, the valve element 31 does not come in contact with the stopper surface 27a, the valve hole 22 staying open.

The elastic member 41 applies an elastic force to the valve element 31. When the pressure at the inflow port 12 becomes equal to or lower than the sum of the internal pressure of the valve chamber 23 and the pressing force of the elastic member 41, the elastic force causes the valve element 31 to move quickly toward the valve seat 21 and close the valve hole 22. When liquid with high viscosity is supplied from the inflow port 12 toward the outflow port 14, and the pressure at the inflow port 12 becomes equal to or lower than the sum of the internal pressure of the valve chamber 23 and the pressing force of the elastic member 41, the valve element 31 pushes away liquid between the valve hole 22 and the valve element 31, and quickly closes the valve hole 22. Also, when supplying liquid with low viscosity, the valve element 31 functions in the same manner to quickly close the valve hole 22.

The contact portions 42 of the elastic member 41 are in contact with the valve element 31 at positions symmetrical with each other with respect to an axis along which the valve element 31 moves. As a result, the contact portions 42 apply an elastic force acting in a direction in which the contact portions 42 approach each other, to the valve element 31 and also apply an elastic force directed toward the valve hole 22, to the valve element 31. Therefore, the elastic member 41 has an aligning function of aligning the center of the valve element 31 with the center of the valve hole 22. In addition, since the elastic member 41 is set in the valve chamber 23 in the direction of traversing the flow of liquid in the valve chamber 23, it is possible to reduce the size of the check valve 10*a* constructed such that a biasing force is applied to the valve element 31, without increasing the longitudinal dimension of the valve case 25.

Figure 6A:
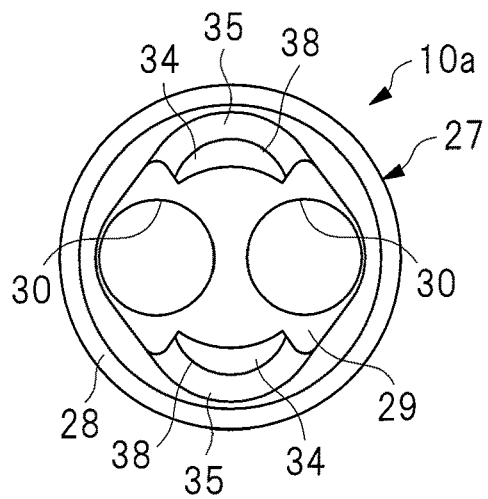
FIGS. 6A-6E are assembling process charts showing assembling procedures for the check valve of FIG. 3.
Figure 6B:
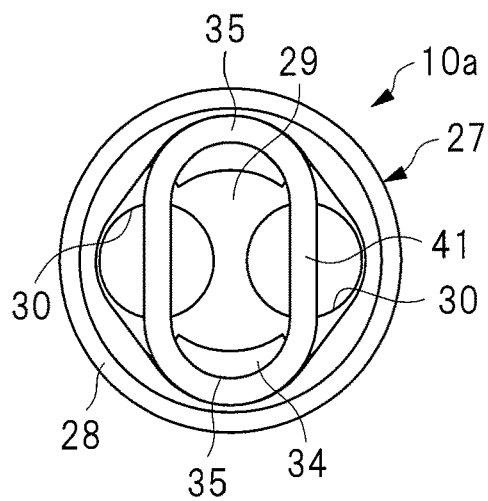

FIGS. 6A to 6E are an assembling process chart showing an assembling procedure for the check valve 10*a*, and views from below in FIGS. 3A and 3B. FIG. 6A shows an interior of the holder 27, in which the elastic member 41 is set in such a manner as shown in FIG. 6B. The elastic member 41 is circular in an initial state. When the elastic member 41 is supported on the holding surfaces 38 outside the engaging projections 34, the elastic member 41 is shaped into an ellipse, and therefore set in the holder 27 as the elliptic elastic member 41, as shown in FIG. 6B.

Figure 6C:
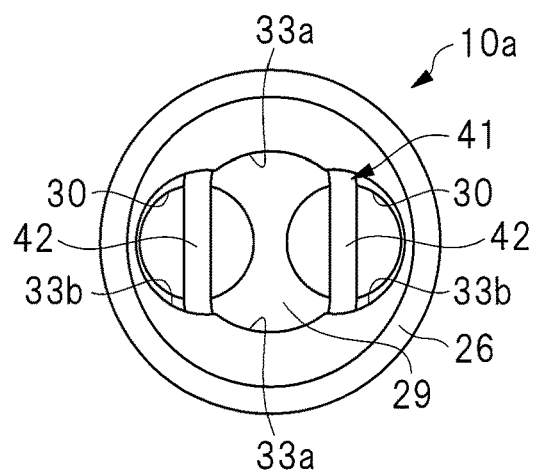
Figure 6D:
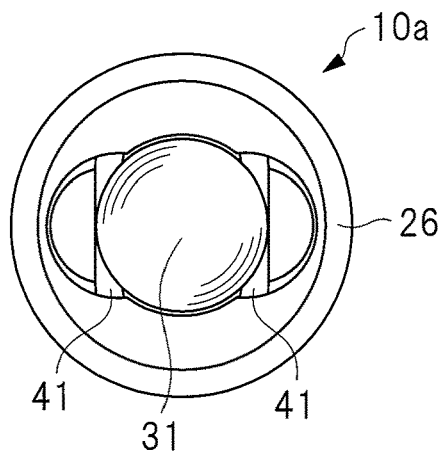
Figure 6E:
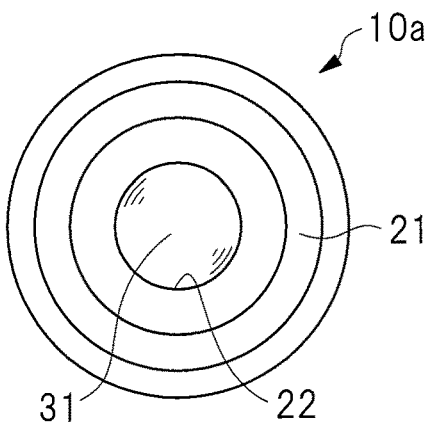

FIG. 6C shows the cylindrical member 26 attached to the holder 27. With the cylindrical member 26 attached to the holder 27, the counter portions 33*a* of the counter surface 33 is counter to the engaging projections 34, thereby causing the counter portions 33*a* to close the engaging grooves 35. This prevents the elastic member 41 from dropping off. As shown in FIG. 6C, in a radially-outward direction of the contact portions 42, a sufficiently-wide elastic deformation space is formed between the contact portions 42 and the inner peripheral surface 36. FIG. 6D shows the spherical valve element 31 placed in the cylindrical member 26, and the valve element 31 set in contact with the contact portions 42 of the elastic member 41. FIG. 6E shows the valve seat 21 attached to the cylindrical member 26.

When the check valve 10*a* assembled in this manner is connected to the pipe for supplying liquid, the check valve 10*a* is housed in the housing 11 as shown in FIG. 1. A sealing material 43*a* is provided between the housing piece 13 and the valve seat 21, and a sealing material 43*b* is provided between the housing piece 15 and the case body 24.

The valve case 25 of the above check valve 10*a* is formed by combining together three components: the valve seat 21, the cylindrical member 26, and the holder 27. However, the cylindrical member 26 and the holder 27 may be formed integrally into the case body 24. In such a case, the case body 24 and the valve seat 21 are combined together to form the valve case 25. In another case, the valve seat 21 and the cylindrical member 26 may be molded integrally into a resin structure. In this case, the cylindrical member 26 formed integrally with the valve seat 21 is combined with the holder 27 to form the valve case 25.

Figure 7A:
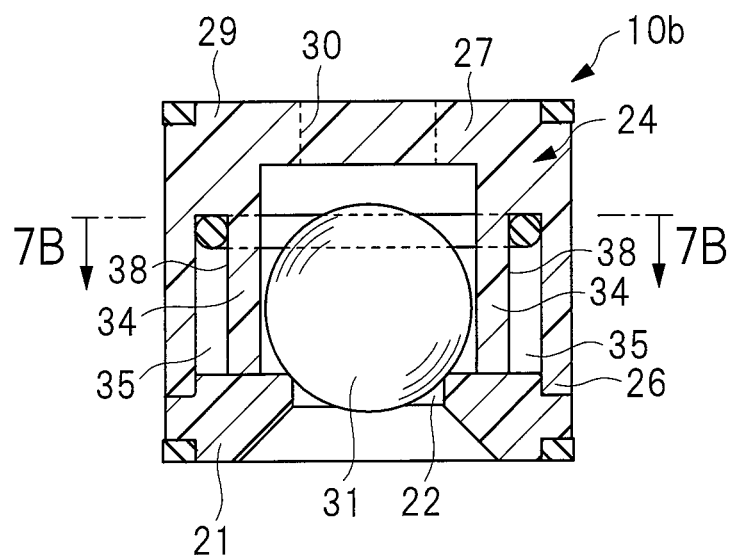
FIG. 7A shows a first modification of the check valve, showing a vertical cross-sectional view of the first modification.
Figure 7B:
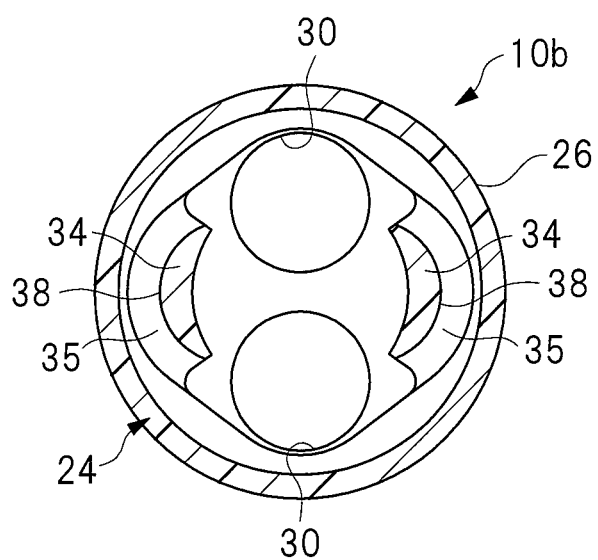
FIG. 7B is a cross-sectional view taken along a line 7B-7B of the first modification of FIG. 7A.

FIGS. 7A and 7B show a check valve 10*b* as a modification of the check valve 10*a*. The case body 24 of the check valve 10*b* of FIGS. 7A and 7B is formed by molding the cylindrical member 26 and the holder 27 of the check valve 10*a* into an integral structure. The engaging projections 34 have the holding surfaces 38 as surfaces counter to the cylindrical member 26. The engaging projections 34 extend axially from the inner surface of the end wall portion 29. In the same manner as in the check valve 10*a*, two holding surfaces 38 are formed at their positions symmetrical with each other with respect to the axis of movement along which the valve element 31 moves.

Figure 8A:
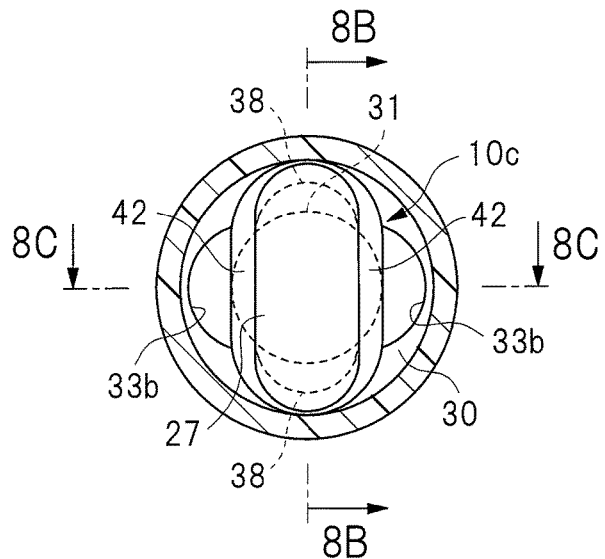
FIG. 8A shows a second modification of the check valve, showing a cross-sectional view taken along a line 8A-8A of the second modification of FIG. 8C.
Figure 8B:
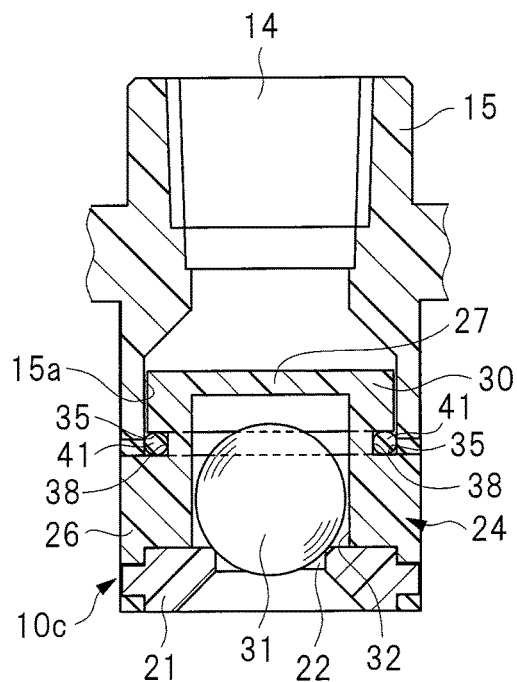
FIG. 8B is a cross-sectional view taken along a line 8B-8B of the second modification of FIG. 8A.
Figure 8C:
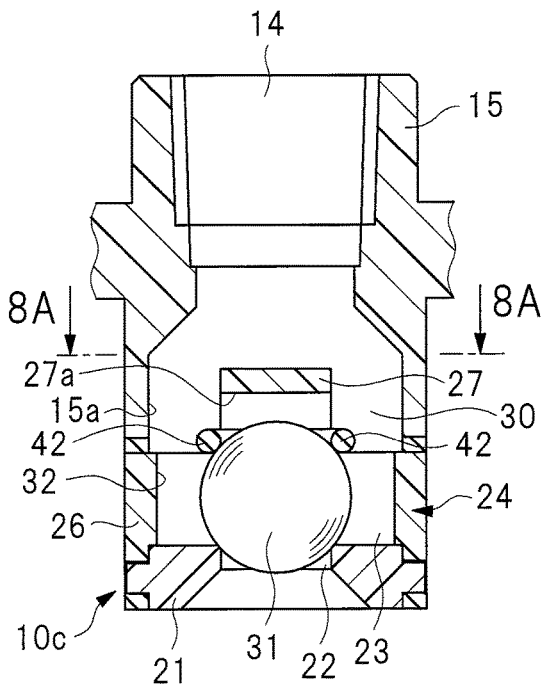
FIG. 8C is a cross-sectional view taken along a line 8C-8C of the second modification of FIG. 8A.

FIGS. 8A to 8C show a check valve 10*c* as a second modification of the check valve 10*a*. In the same manner as in the check valve 10*b* of FIGS. 7A and 7B, the case body 24 of the check valve 10*c* of FIG. 8 is formed by molding the cylindrical member 26 and holder 27 into an integral structure. The holder 27 of the check valve 10*c* extends radially across the valve chamber 23, and is integrally formed with an end of the cylindrical member 26. The holder 27 sticks into a cylindrical portion 15*a* formed in the housing piece 15, as shown in FIGS. 8B and 8C. The holder 27 has a length nearly equal to the inner diameter of the cylindrical portion 15*a*, and has a width shorter than the diameter of the valve element 31. The holder 27 has the holding surfaces 38 formed on its both ends. The elastic member 41 is supported on the holding surfaces 38, and therefore set in the case body 24. The communication holes 30 are formed between the holder 27 and the inner peripheral surface of the cylindrical portion 15*a*.

Figure 9A:
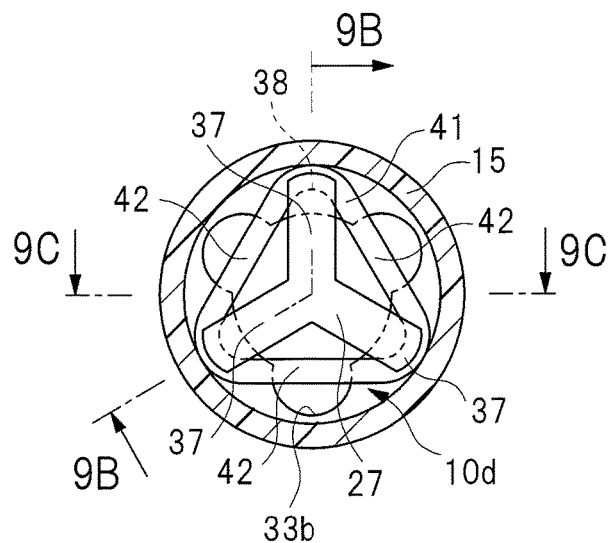
FIG. 9A shows a third modification of the check valve, showing a cross-sectional view taken along a line 9A-9A of the third modification of FIG. 9C.
Figure 9B:
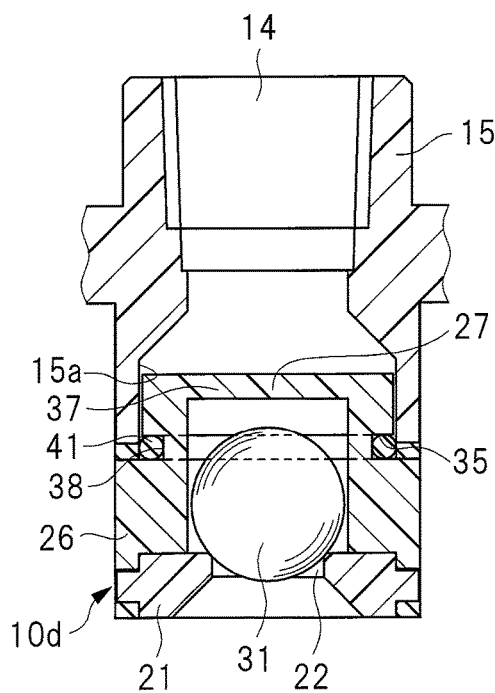
FIG. 9B is a cross-sectional view taken along a line 9B-9B of the third modification of FIG. 9A.
Figure 9C:
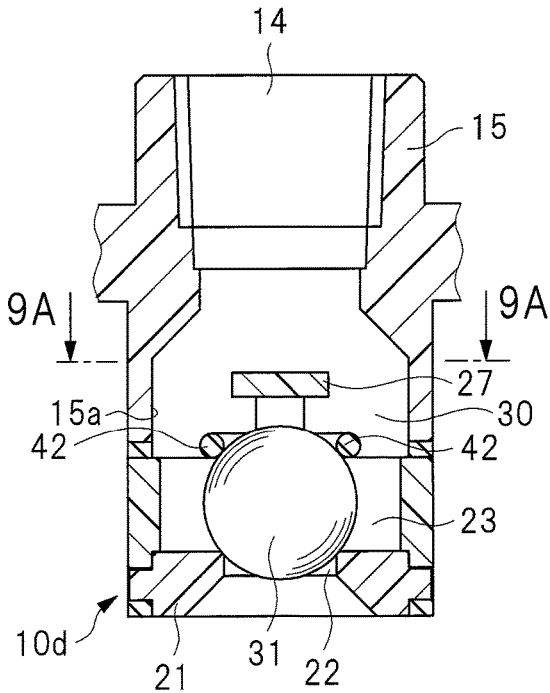
FIG. 9C is a cross-sectional view taken along a line 9C-9C of the third modification of FIG. 9A.
Figure 10A:
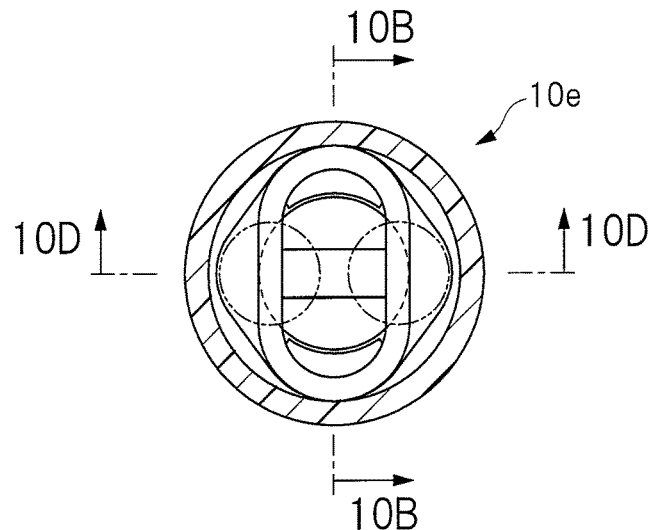
FIG. 10A shows a fourth modification of the check valve, showing a cross-sectional view taken along a line 10A-10A of the fourth modification of FIG. 10D.
Figure 10B:
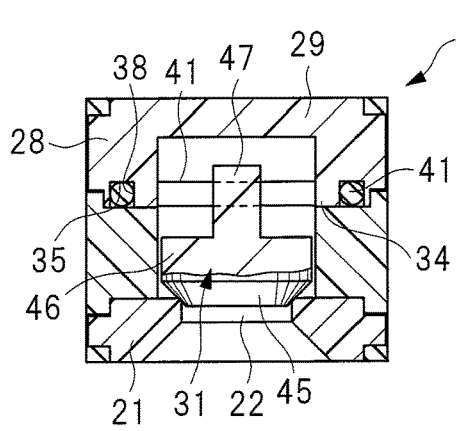
FIG. 10B is a cross-sectional view taken along a line 10B-10B of the fourth modification of FIG. 10A, showing the valve element leaving the valve hole closed.
Figure 10D:
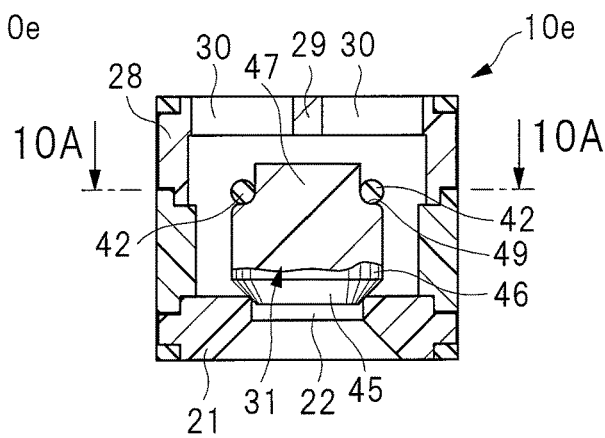
FIG. 10D is a cross-sectional view taken along a line 10D-10D of the fourth modification of FIG. 10A, showing the valve element leaving the valve hole closed.
Figure 10C:
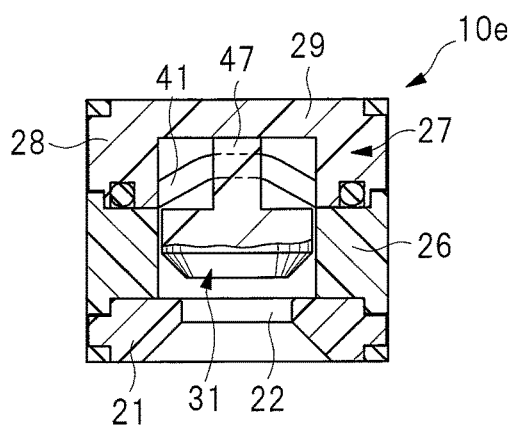
FIG. 10C is a cross-sectional view showing part the same as that of FIG. 10B, the valve element leaving the valve hole open.
Figure 10E:
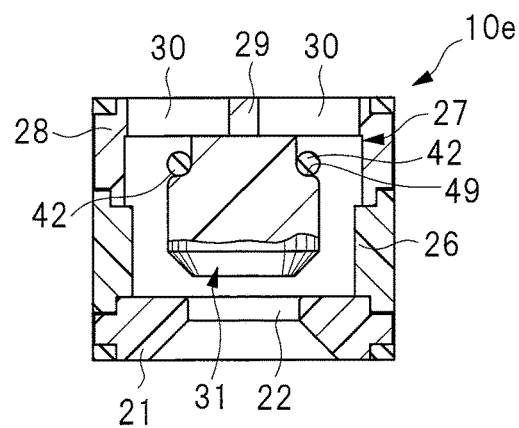
FIG. 10E is a cross-sectional view showing part the same as that of FIG. 10D, the valve element leaving the valve hole open.

FIGS. 9A to 9C show a check valve 10*d* as a third modification of the check valve 10*a*. Similar to the check valve 10*c* of FIG. 8, the check valve 10*d* has the case body 24 formed by molding the cylindrical member 26 and holder 27 into an integral structure. The holder 27 has three holder pieces 37 radiating outward in three directions. The holder pieces 37 are arranged at 120-degree intervals, and each provided with the holding surface 38 on the radial outer end of each holder piece 37. Three holding surfaces 38 are thus formed at predetermined intervals in the circumferential direction in the valve case 25.

The elastic member 41 is supported on the holding surfaces 38. As a result, the elastic member 41 shaped substantially into a triangle is set in the case body 24 as shown in FIG. 9A. According to the check valve 10*d* of this structure, therefore, the elastic member 41 brings its three contact portions 42 between the three holding surfaces 38 into contact with the valve element 31, thereby applies an elastic force to the valve element 31. In this manner, in the check valve 10*d*, the contact portions 42 shifted in the circumferential direction with respect to the holding surfaces 38 apply the elastic force of the elastic member 41, which is directed toward the valve hole 22 to the valve element 31.

In this manner, with the elastic force applied to the valve element 31 at a plurality of points shifted in the circumferential direction with respect to the holding surfaces 38, the number of contact portions 42 is not limited to 2 or 3. The elastic member 41, for example, may be provided with 4 or more contact portions 42. In the case of forming the case body 24 by combing the cylindrical member 26 and the holder 27 together, three engaging grooves 35 may be formed on the case body 24.

FIGS. 10A to 10D show a check valve 10*e* as a fourth modification of the check valve 10*a*. The check valve 10*e* is similar in configuration to the check valve 10*a* of FIGS. 3 to 5 in that the cylindrical member 26 and the holder 27, each of which forms part of the case body 24, are discrete components. Therefore, the cylindrical member 26 and the holder 27 are assembled into the case body 24. Similar to the check valve 10*a*, the holder 27 has: the cylindrical portion 28; and the end wall portion 29 formed with two communication holes 30 offset to the center of the end wall portion 29. Similar to the check valve 10*a*, the holder 27 has two engaging projections 34 which are counter to each other with respect to an axis along which the valve element 31 moves, and extend in a axial direction. The engaging projections 34 have respective holding surfaces 38 set counter to the inner peripheral surface 36 of the cylindrical portion 28. The elastic member 41 is supported on the two holding surfaces 38, shaped into an ellipse which traverses a flow of liquid in the valve chamber 23, and therefore set in the valve chamber 23.

The valve element 31 has a disc portion 46 with a conical surface 45 formed on its front end, the conical surface 45 coming in contact with the opening of the valve hole 22, and an biasing portion 47 formed integrally with the disc portion 46. The biasing portion 47 extends in the radial direction of the disc portion 46, and has a length substantially equal to the outer diameter of the disc portion 46. The biasing portion 47 has pressure-bearing surfaces 49 formed on its both ends, and pressure-bearing surfaces 49 are pressed by two contact portions 42 of the elastic member 41.

In this manner, the valve element 31 is not limited in shape. For example, the valve element 31 may be spherical, or formed as a disc-shaped valve element having a conical surface 45. In addition, the valve element 31 may have a plane which comes in contact with the valve seat, without having a conical surface 45.

Figure 11:
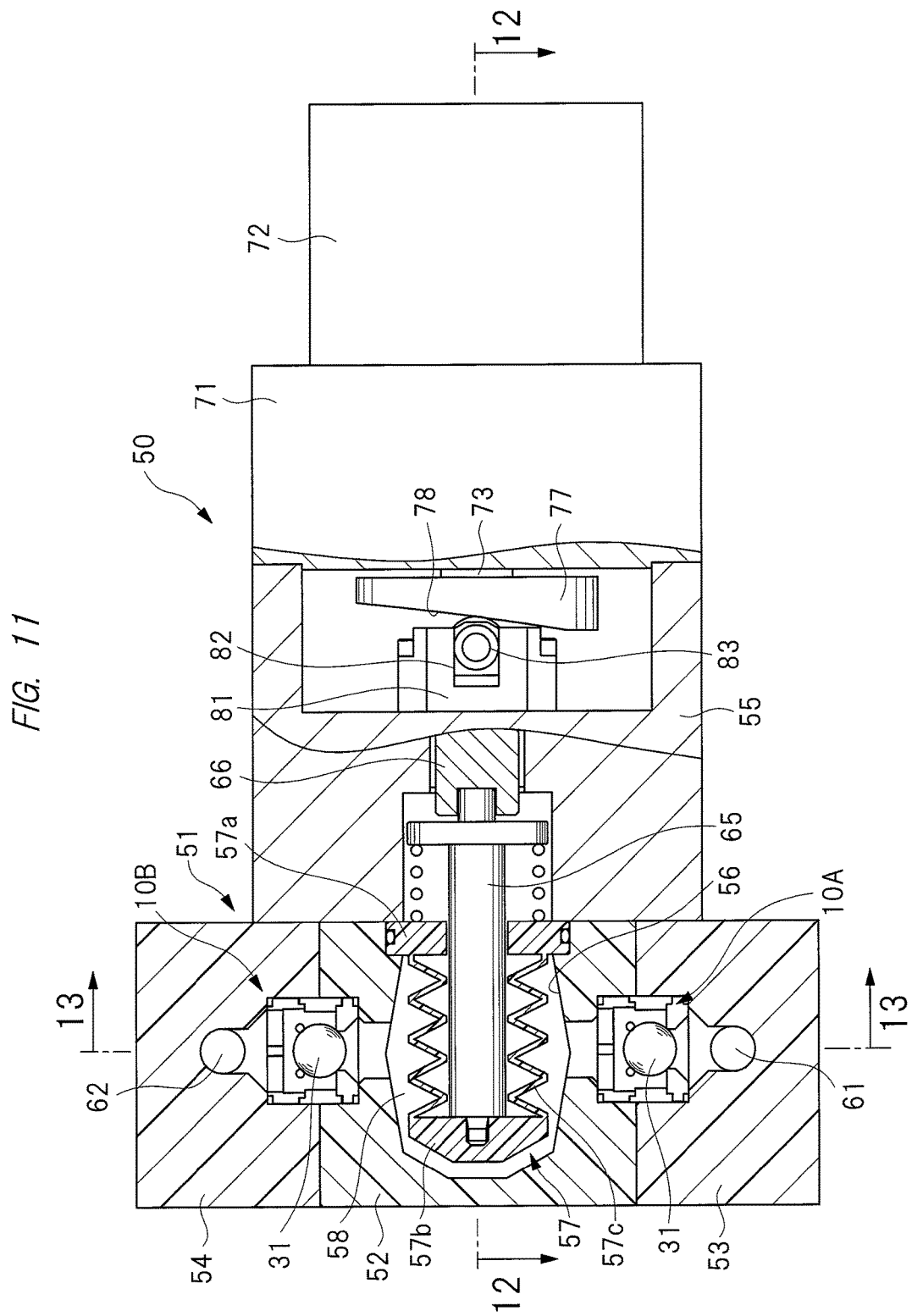
FIG. 11 is a cross-sectional view of a liquid supply apparatus including the check valve of FIG. 3.
Figure 12:
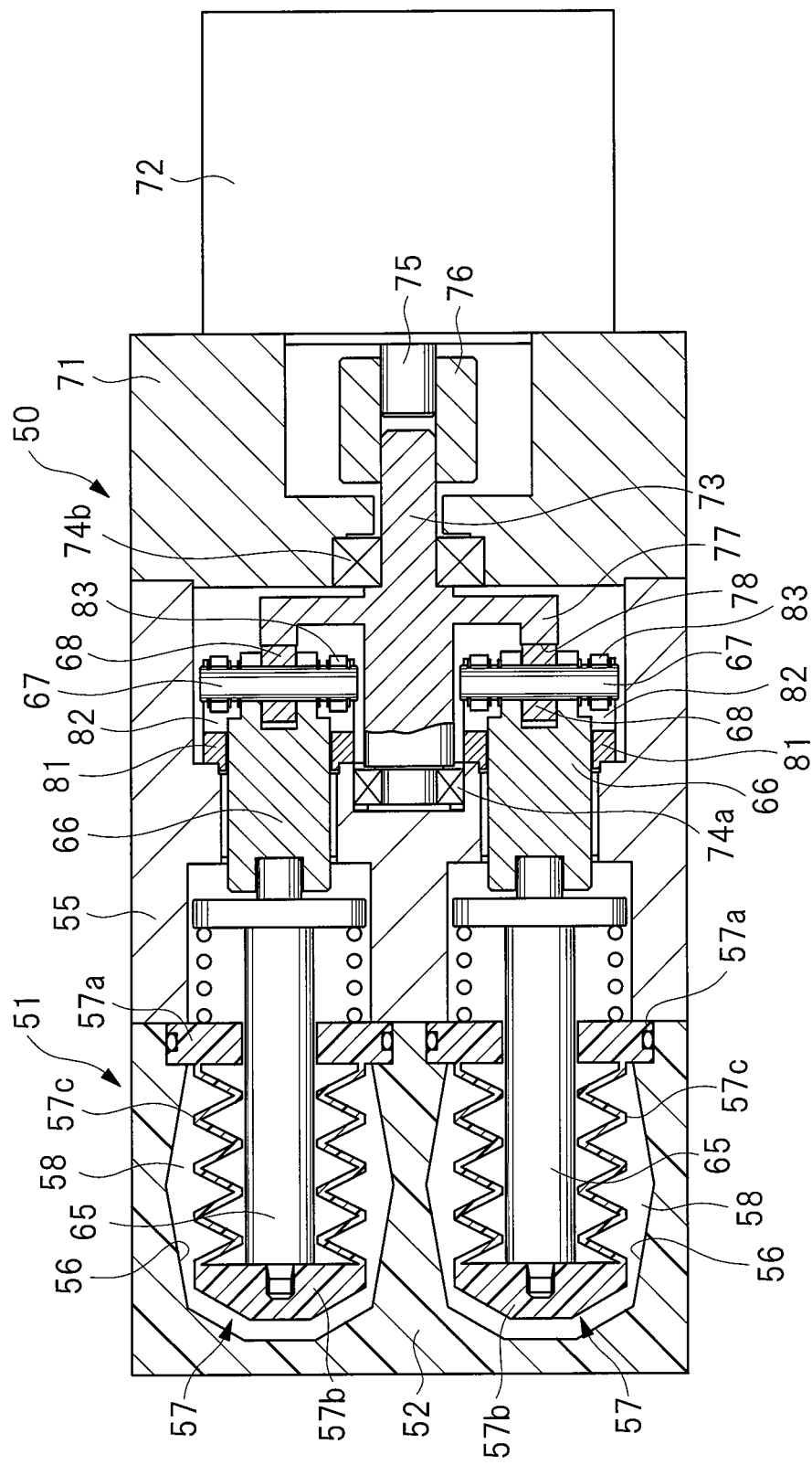
FIG. 12 is a cross-sectional view taken along a line 12-12 of FIG. 11.
Figure 13:
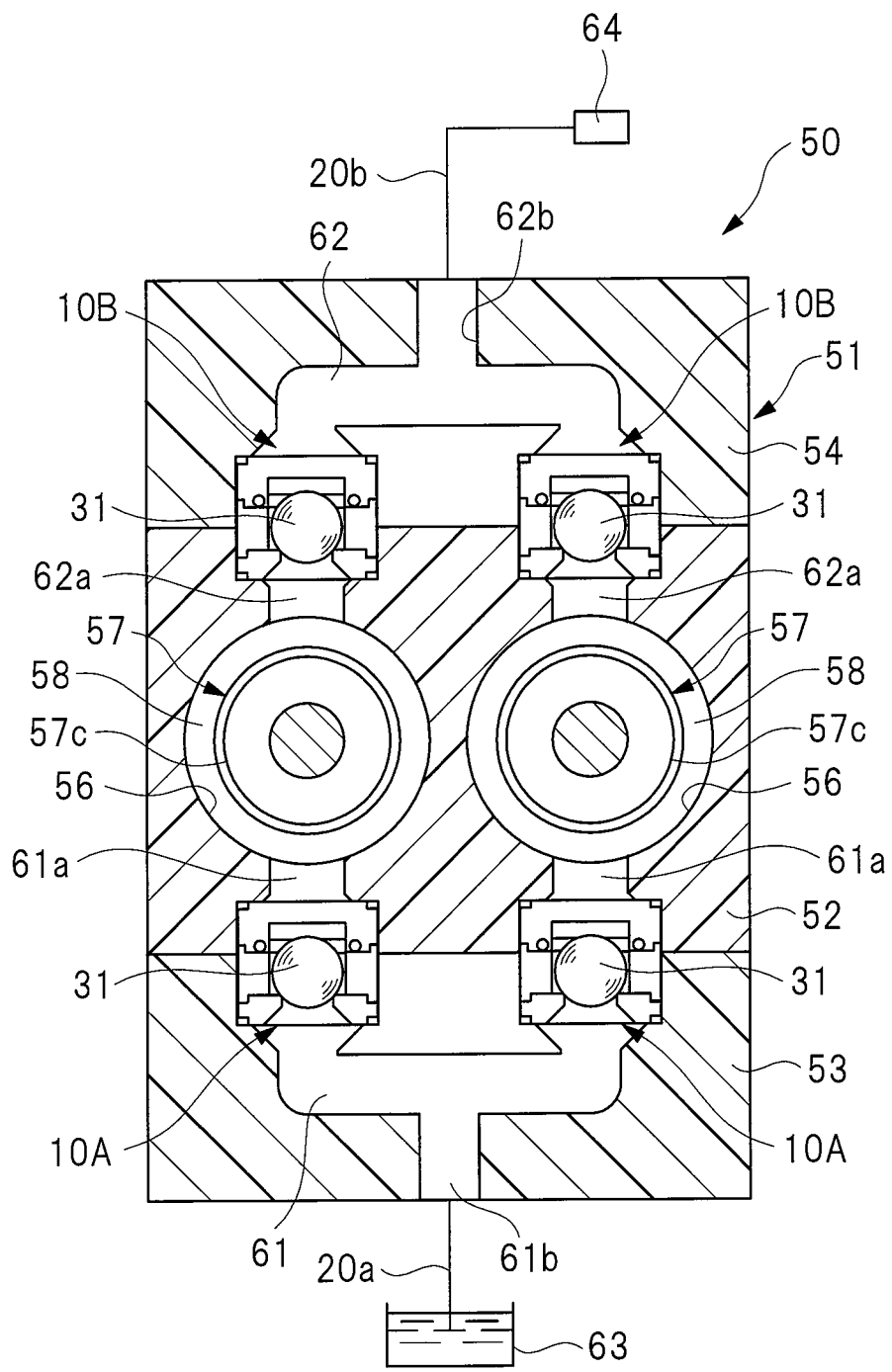
FIG. 13 is a cross-sectional view taken along a line 13-13 of FIG. 11.

FIG. 11 is a cross-sectional view of a liquid supply apparatus including the check valve of FIGS. 3A and 3B, FIG. 12 is a cross-sectional view taken along a line 12-12 of FIG. 11, and FIG. 13 is a cross-sectional view taken along a line 13-13 of FIG. 11.

As shown in FIGS. 11 to 13, the liquid supply apparatus 50 includes a pump assembly 51, and the pump assembly 51 has: a pump block 52; and two channel blocks 53 and 54 respectively attached to the top and bottom of the pump block 52 so that the channel blocks 53 and 54 are opposite to each other. A drive block 55 is attached to the pump assembly 51. The pump block 52 is formed with two bottomed holes 56. Each bottomed hole 56 has an opening directed to the drive block 55, and bellows 57 is disposed in the bottomed holes 56. Each bellows 57 has: a base 57a fixed to the opening of the bottomed hole 56; a head 57b; and a bellows portion 57c between the base 57a and the head 57b. The bellows 57 and the bottomed hole 56 separate a pump chamber 58. Two pump chambers 58 are formed in the pump block 52.

As shown in FIG. 13, an inflow-side channel 61 is formed in the channel block 53. The inflow-side channel 61 communicates with pump chambers 58 via communication holes 61a formed in the pump block 52. An outflow-side channel 62 is formed in the channel block 54. The outflow-side channel 62 communicates with the pump chambers 58 via communication holes 62a formed in the pump block 52.

Inflow-side check valves 10A are respectively disposed between the inflow-side channel 61 and the communication holes 61a. The inflow-side check valves 10A are held between the channel block 53 and the pump block 52. Outflow-side check valves 10B are respectively disposed between the outflow-side channel 62 and the communication holes 62a. The outflow-side check valves 10B are held between the channel block 54 and the pump block 52. The check valves 10A and 10B are the same in structure as the check valve 10a of FIG. 3.

The inflow-side pipe 20a connected to the inflow port 61b of the inflow-side channel 61 extends to a liquid container 63, and liquid is supplied from the liquid container 63 to the pump assembly 51 via the pipe 20a. The outflow port 62b of the outflow-side channel 62 is connected to a discharge device 64 via the outflow-side pipe 20b. Liquid discharged out of the pump assembly 51 is supplied to the discharge device 64 which applies liquid to a workpiece.

A plunger 65 which serves as a drive member which drives the pump is incorporated in each bellows 57. The axial reciprocation of the plunger 65 causes the bellows 57 to extend and contract in an axial direction thereof. The extension of the bellows 57 results in the contraction of the pump chamber 58, while the contraction of the bellows 57 results in the expansion of the pump chamber 58. The expansion of the pump chamber 58 causes liquid in the liquid container 63 to be sucked into the pump chamber 58.

In this process, at the inflow-side check valve 10A, the valve element 31 opens the valve hole 22 to allow liquid to flow from the inflow-side channel 61 into the pump chamber 58. At the outflow-side check valve 10B, the valve element 31 closes the valve hole 22 to prevent liquid from flowing backward. On the other hand, the contraction of the pump chamber 58 sends liquid sucked into the pump chamber 58 toward the discharge device 64. In this process, at the outflow-side check valve 10B, the valve element 31 opens the valve hole 22 to allow liquid to flow from the pump chamber 58 to the outflow-side channel 62. At the inflow-side check valve 10A, the valve element 31 closes the valve hole 22 to prevent liquid from flowing backward.

As shown in FIG. 12, two drive rods 66 are incorporated in the drive block 55 such that they reciprocate freely in the axial direction. The drive rods 66 have respective first ends connected to the plungers 65, and respective seconds ends fitted with shafts 67. The shafts 67 extend in the radial direction of the drive rods 66. Drive rollers 68 are rotatably attached to the respective shafts 67.

A motor holder 71 is attached to the drive block 55, and an electric motor 72 is attached to the motor holder 71. A cam shaft 73 is incorporated in the drive block 55, and the cam shaft 73 is rotatably supported by bearings 74a and 74b in the drive block 55. The cam shaft 73 is connected to a motor main shaft 75 via a connector 76, and driven and rotated by the electric motor 72. The cam shaft 73 is provided with cam members 77. The drive rollers 68 come in rolling contact with cam surfaces 78 of the cam members 77. As shown in FIG. 11, the cam surfaces 78 are inclined with respect to the axis of the cam shaft 73. When the cam shaft 73 is rotated, the drive rollers 68 in rolling contact with the cam surfaces 78 cause the drive rods 66 to reciprocate in an axial direction. The reciprocation of the drive rods 66 causes the bellows 57 to extend and contract via the plungers 65, thereby causing the pump chambers 58 to expand and contract.

The rotating cam shaft 73 causes one drive rod 66 to move in a direction of extending the bellows 57 while causing the other drive rod 66 to move in a direction of contracting the bellows 57. In this manner, the drive rods 66 are moved in respective directions reverse to each other. This operation causes the pump chambers 58 to deliver liquid by turns, and a fixed amount of liquid can be supplied from the pump assembly 51 to the discharge device 64 while suppressing pulsatile flow.

In order to drive the drive rods 66 smoothly in the axial direction, two guides 81 are incorporated in the drive block 55. The drive rods 66 extend through the respective guides 81 which have guide grooves 82. Guide rollers 83 are mounted on respective ends of each shaft 67, and the ends of each shaft 67 are placed in each guide groove 82. When each drive rod 66 reciprocates in the axial direction, the guide rollers 83 act so as to prevent the drive rod 66 from being inclined with respect to the axial direction, thereby ensuring the reciprocal movement of the drive rod 66 along the axial direction.

When a sucking operation of expanding the pump chamber 58 to allow liquid to be sucked into the pump chamber 58 is stopped, the valve element 31 of the check valve 10A provided with the elastic member 41 is moved by the elastic force in a direction of closing the valve hole 22. Therefore, even of high viscosity liquid is supplied to the discharge device 64, the valve hole 22 is certainly closed with the valve element 31 before the pump chamber 58 shifts from an expansive operation to a contractive operation, thereby allowing the liquid supply apparatus 50 to supply liquid with a high degree of accuracy to the discharge device 64.

In addition, the elastic member 41 has an aligning function to align the center of the valve element 31 with the center of the valve hole 22, thereby allowing the valve element 31 to make an action of opening and closing the valve hole 22 in an accurate manner, and increasing the accuracy of liquid to be supplied to the discharge device 64. The elastic member 41 is disposed in the valve chamber 23 such that the elastic member 41 is set in the direction in which it traverses a flow of liquid in the valve chamber 23. This allows a reduction in size of the check valve in the liquid flow direction, thus allowing the pump assembly 51 including the check valves incorporated therein.

In the liquid supply apparatus 50, the pump assembly 51 is formed with two pump chambers 58, and four check valves. The number of the pump chambers 58 included in the pump assembly 51, however, is not limited to two. One, three, or more pump chambers 58 may be formed in the pump assembly 51. Each check valve may not be incorporated into the pump assembly 51 and may be disposed on the inflow-side pipe 20a and on the outflow-side pipe 20b so that the check valve is separated from the pump assembly 51. In such a case, as shown in FIG. 1, the check valve structured to be housed in the housing 11 is used. In the liquid supply apparatus 50, the check valve 10a of FIG. 3 is used as the inflow-side check valve 10A and also as the outflow-side check valve 10B. However, the check valve 10a may be used as at least either the inflow-side check valve 10A or outflow-side check valve 10B.

In this embodiment, the liquid supply apparatus 50 is provided with check valves 10a shown in FIG. 3. However, any one of the above check valves 10a to 10e may be used as each check valve 10A and 10B included in the liquid supply apparatus 50.

The present invention is not limited to the above embodiments, and may be modified into various forms within the scope of the present invention. For example, the liquid supply apparatus 50 is not limited to a liquid supply apparatus having a bellows pump as shown in FIGS. 11 to 13. The above check valve may be provided to a liquid supply apparatus having any one of a bellows pump, a diaphragm pump, a diaphragm pump, a syringe pump, or other pump which can perform a liquid discharge operation via expansion/contraction of a pump chamber. In addition, the elastic member does not depend on whether to have a uniform cross section. For example, the elastic member may have a non-uniform cross section, or may have a non-uniform sectional area.

The liquid supply apparatus is used for application of liquid such as photoresist solution to a workpiece, and the check valve is incorporated in this liquid supply apparatus.

Although various embodiments of the present invention have been described and shown, the invention is not restricted thereto, but may also be embodied in other ways within the scope of the subject-matter defined in the following claims.

What is claimed is:

1. A check valve which allows liquid to flow in one direction while preventing liquid from flowing in a direction reverse to said one direction, the check valve comprising:
   a case body having a cylindrical member and a holder;
   an inflow port allowing liquid to flow therein;
   an outflow port allowing liquid to flow out thereof;
   a valve seat provided between the inflow port and the outflow port, the valve seat having a valve hole through which the inflow port communicates with the outflow port;
   a valve chamber provided between the valve seat and the outflow port;
   a valve element disposed in the valve chamber, the valve element opening and closing the valve hole; and
   an elastic member set in the valve chamber, the elastic member applying an elastic force directed toward the valve hole to the valve element, wherein
   the holder has a cylindrical portion and a pair of engaging projections each having a holding surface extending in an axial direction and radially outside the valve element,
   the elastic member is supported in an engaging groove formed each engaging projection and an inner peripheral surface of the cylindrical portion, and radially outside the engaging projections.

2. The check valve according to claim 1, wherein the holding surfaces are symmetrically located with respect to an axis for movement of the valve element.

3. The check valve according to claim 2, wherein the valve element is spherical, and the elastic member is brought in contact with the spherical valve element.

4. The check valve according to claim 2, wherein
   the valve element includes:
   a surface which comes in contact with an opening of the valve hole; and
   a biasing portion having a pressure-bearing surface pressed by the elastic member.

5. The check valve according to claim 1, wherein the valve element is spherical, and the elastic member is brought in contact with the spherical valve element.

6. The check valve according to claim 1, wherein
   the valve element includes:
   a surface which comes in contact with an opening of the valve hole; and
   a biasing portion having a pressure-bearing surface pressed by the elastic member.

7. A liquid supply apparatus which supplies liquid held in a liquid container to a discharge device, the liquid supply apparatus comprising:
   a pump block including a pump chamber communicating with an inflow-side channel and with an outflow-side channel;
   a drive member incorporated in the pump block, the drive member causing the pump chamber to expand and contract;
   an inflow-side check valve disposed in the inflow-side channel, the inflow-side check valve allowing liquid to flow from the inflow-side channel to the pump chamber when the pump chamber expands, while preventing liquid from flowing backward from the pump chamber to the inflow-side channel when the pump chamber contracts; and
   an outflow-side check valve disposed in the outflow-side channel, the outflow-side check valve allowing liquid to flow from the pump chamber to the outflow-side channel when the pump chamber contracts, while preventing liquid from flowing backward from the outflow-side channel to the pump chamber when the pump chamber expand,
   wherein at least either the inflow-side check valve or the outflow-side check valve is constituted by the check valve of claim 1.

8. The check valve according to claim 1, wherein three holding surfaces are arranged at intervals of equal angels around an axis for movement of the valve element.

9. The check valve according to claim 8, wherein the valve element is spherical, and the elastic member is brought in contact with the spherical valve element.

10. The check valve according to claim 8, wherein the valve element includes:
    a surface which comes in contact with an opening of the valve hole; and
    a biasing portion having a pressure-bearing surface pressed by the elastic member.

11. The check valve according to claim 1, wherein the elastic member has a ring-shaped structure.

12. The check valve according to claim 11, wherein the valve element is spherical, and the elastic member is brought in contact with the spherical valve element.

13. The check valve according to claim 11, wherein the valve element includes:
    a surface which comes in contact with an opening of the valve hole; and
    a biasing portion having a pressure-bearing surface pressed by the elastic member.

14. A check valve which allows liquid to flow in one direction while preventing liquid from flowing in a direction reverse to said one direction, the check valve comprising:
    an inflow port allowing liquid to flow therein;
    an outflow port allowing liquid to flow out thereof;
    a valve seat provided between the inflow port and the outflow port, the valve seat having a valve hole through which the inflow port communicates with the outflow port;
    a cylindrical member in which the valve seat is fitted in one end thereof,
    a holder provided with a communication hole which communicates with the outflow port, and fitted in the other end of the cylindrical member;
    a valve chamber provided between the valve seat and the outflow port;
    a valve element disposed in the valve chamber, the valve element opening and closing the valve hole;
    a pair of engaging projections provided to the holder and extending in an axial direction;
    a plurality of holding surfaces radially outside the engaging projections, and located radially outside the valve element, the holding surfaces extending in an axial direction; and
    a groove formed between each holding surface and an inner peripheral surface of the cylindrical member;
    counter portions provided to the cylinder member so as to face the engaging projections, and close the engaging grooves, and
    an elastic member supported in each groove and set in the valve chamber, the elastic member applying an elastic force directed toward the valve hole to the valve element.

* * * * *